United States Patent
Kawakami

(10) Patent No.: US 10,035,227 B2
(45) Date of Patent: Jul. 31, 2018

(54) POSITIONING DEVICE

(71) Applicant: PASCAL ENGINEERING CORPORATION, Hyogo (JP)

(72) Inventor: Takayuki Kawakami, Hyogo (JP)

(73) Assignee: Pascal Engineering Corporation, Hyogo (JP)

( * ) Notice: Subject to any disclaimer, the term of this patent is extended or adjusted under 35 U.S.C. 154(b) by 333 days.

(21) Appl. No.: 14/782,398

(22) PCT Filed: Feb. 14, 2014

(86) PCT No.: PCT/JP2014/053535
§ 371 (c)(1),
(2) Date: Oct. 5, 2015

(87) PCT Pub. No.: WO2014/171173
PCT Pub. Date: Oct. 23, 2014

(65) Prior Publication Data
US 2016/0052096 A1     Feb. 25, 2016

(30) Foreign Application Priority Data

Apr. 15, 2013 (JP) ................................. 2013-084577

(51) Int. Cl.
*B25B 1/00* (2006.01)
*B23Q 1/00* (2006.01)

(52) U.S. Cl.
CPC ..................................... *B23Q 1/009* (2013.01)

(58) Field of Classification Search
CPC ................................ B23Q 1/009; B23Q 3/08
See application file for complete search history.

(56) References Cited

U.S. PATENT DOCUMENTS

| 6,095,509 A | 8/2000 | Yonezawa |
| 2006/0033255 A1 | 2/2006 | Yonezawa et al. |
| 2006/0289709 A1 | 12/2006 | Yonezawa et al. |
| 2009/0267281 A1 | 10/2009 | Kitamura et al. |

(Continued)

FOREIGN PATENT DOCUMENTS

| EP | 2 543 468 A1 | 1/2013 |
| JP | 5-39787 | 5/1993 |

(Continued)

*Primary Examiner* — David Bryant
*Assistant Examiner* — Nirvana Deonauth
(74) *Attorney, Agent, or Firm* — Norris McLaughlin & Marcus, P.A.

(57) ABSTRACT

A positioning device capable of increasing the amount of diametrical expansion of an engagement member to be engaged in a cylindrical hole in a workpiece, and capable of performing positioning while not exerting any force on the workpiece in the downward direction positions a cylindrical hole (Ha) in a workpiece (W) in a first direction while permitting shifting thereof in a second direction, the device comprising: the insertion shaft member; a hydraulic cylinder for driving the insertion shaft member; a pair of engagement members; a taper engagement mechanism for shifting the engagement members to increase their diameter; and a movement permitting holding mechanism that, along with supporting the engagement members, so that they cannot shift in the first direction but are capable of shifting in the second direction.

11 Claims, 12 Drawing Sheets

(56) References Cited

U.S. PATENT DOCUMENTS

2010/0320664 A1* 12/2010 Kawakami ............ B23Q 1/009
                                                                                          269/32
2012/0319340 A1   12/2012  Kawakami

FOREIGN PATENT DOCUMENTS

| JP | 11-188551   | 7/1999  |
|----|-------------|---------|
| JP | 2007-195583 | 7/2004  |
| JP | 2004223702  | 8/2004  |
| JP | 2006-007334 | 1/2006  |
| JP | 2007-021598 | 2/2007  |
| JP | 2009-000750 | 1/2009  |
| JP | 4799487     | 10/2011 |

* cited by examiner

POSITIONING DEVICE

TECHNICAL FIELD

The present invention relates to a positioning device that, when positioning a workpiece by engaging an insertion shaft member and a pair of engagement members that are mounted to a reference side of a base member into a cylindrical hole in the workpiece, performs positioning without lowering the pair of engagement members in such a manner that the workpiece cannot be shifted in a first direction which is orthogonal to the axis of the insertion shaft member, but can be shifted in a second direction which is orthogonal to the first direction, and also relates to a positioning device that performs positioning so that the workpiece cannot be shifted in either the first or the second direction.

BACKGROUND OF THE INVENTION

Positioning and fixing devices of various types have been proposed and are currently supplied for use that position and fix, on a table of a machining center or the like, a workpiece pallet that is provided for fixing, conveying, and positioning a workpiece in the machining center or the like. As positioning devices of this type, there are employed both an all-direction positioning device that positions the workpiece both in an X direction and in a Y direction within the horizontal plane, and a one-way positioning device that is only capable of positioning the workpiece horizontally in a first direction, while permitting shifting in the other direction.

When a workplace is to be positioned precisely within the horizontal plane, since pitch errors in the distance between a pair of cylindrical holes in the workpiece may arise during machining for forming the holes, accordingly one of the cylindrical holes is positioned with an all-direction positioning device, and then, in order to absorb the error in pitch, the other cylindrical hole is positioned with a one-way positioning device.

The positioning device described, in Patent Document #1 comprises a main body member, a plug portion that is formed to project upward above the top of the main body member, taper shaped positioning portions (i.e. tapered portions) that are formed on opposite side portions of the external peripheral portion of the plug portion so as to sandwich its axis between them and that reduce in diameter upward, a tapered sleeve that is fitted over the tapered portion of the plug member, a drive rod that is passed through the plug portion and the tapered sleeve and to whose upper end portion the upper end portion of the tapered sleeve is integrally connected, and a hydraulic cylinder that is capable of driving the drive rod so as to raise and lower it.

After the plug portion and the tapered sleeve have been inserted into a hole in the workpiece, the drive rod is driven downward by the hydraulic cylinder so that the tapered sleeve is expanded diametrically and is tightly contacted against the inner circumferential surface of the hole, and thereby it is arranged to position the workpiece so that it is not capable of shifting in a first direction that is orthogonal to a horizontal direction connecting the pair of axes of two of these positioning devices, while being capable of shifting horizontally in a second direction that connects that pair of axes.

The positioning device described in Patent Document #2 (refer to FIGS. 3 and 4 of that publication) has a structure that resembles the positioning device described above, but is built with the plug member being provided separately from the main body member, with a tapered portion that reduces in diameter upward being formed on the external peripheral portion of the plug portion, with a slide flange portion at the lower end portion of the plug member being shiftably installed in a long aperture that is formed in the main body member, and with the drive rod being slightly shiftable in the horizontal direction with respect to the output member of the hydraulic cylinder (i.e. with respect to its piston member); and the plug member, the drive rod, and the tapered sleeve are not capable of shifting in a first direction, but are capable of shifting horizontally in a second direction that is orthogonal to that first direction.

Patent Document #1: JP Laid-Open Patent Publication 2006-7334

Patent Document #2: JP 4,799,487 Patent Publication

SUMMARY OF THE INVENTION

While, with the positioning devices of Patent Documents #1 and #2, the structure is such that close contact of the tapered sleeve with the inner circumferential surface of the cylindrical hole is established via elastic deformation of the tapered sleeve, the amount of elastic deformation of the tapered sleeve must be kept within its elastic range, so that, in these cases, the amount of diametrical expansion by which the external diameter of the tapered sleeve can be expanded is severely limited. For example, if the cylindrical hole is 10 mm in diameter, then the external diameter of the tapered sleeve in its diameter constricted state must be set to around 9.9 mm. Due to this, it is not possible to insert the plug portion and the tapered sleeve smoothly and rapidly into the cylindrical hole in the workpiece. In particular, if the range of tolerance for the cylindrical hole is large, then cases may occur in which it is not possible to perform insertion into the cylindrical hole, or in which it is not possible to achieve close contact against the inner circumferential surface of the cylindrical hole, or the like.

Moreover, when close contact against the inner circumferential surface of the cylindrical hole is established by lowering the tapered sleeve and performing diametrical expansion, since the tapered sleeve shifts slightly downward and therefore a force acts on the workpiece in the downward direction, accordingly the accuracy of machining of the object to be processed may be deteriorated, because the workpiece may be shifted or deformed.

Objects of the present invention are to provide a positioning device that is capable of increasing the amount of diametrical expansion of an engagement member that is tightly engaged in a cylindrical hole, to provide a positioning device that is capable of performing positioning while not exerting any force on the workpiece in the downward direction, and so on.

The present invention presents a positioning device that, by engaging an insertion shaft member provided to a base member to be a reference side into a cylindrical hole of a workpiece so as to content closely via engagement members, is capable of positioning the workpiece in a first direction that is orthogonal to a vertical axis of the insertion shaft member while permitting shifting of the workpiece in a second direction that is orthogonal to the vertical axis and to the first direction, characterized by comprising: a main body member fixed to the base member; the insertion shaft member, that is installed to the main body member and whose upper end portion, projects upward from an upper side of the main body member; a fluid pressure cylinder capable of driving the insertion shaft member upward and downward; a pair of engagement members that are disposed on opposite sides of the insertion shall member hi the first direction; a taper engagement mechanism that, by shifting the insertion shaft member downward with respect to the pair of engagement members with the fluid pressure cylinder, causes the pair of engagement members to shift so that their diameter increases; and a movement permitting holding mechanism that, along with supporting the pair of engagement members so that they cannot move downward, also holds them so that they cannot shift in the first direction but can shift in the second direction; and further characterized by, along with being constructed so that, after the upper end portion of the insertion shaft member and the upper portions of the pair of engagement members have been inserted into the cylindrical hole of the workpiece via the movement permitting holding mechanism, the external diameter of the pair of engagement members is increased via the taper engagement mechanism by the insertion shaft member being driven downward by the fluid pressure cylinder so that the pair of engagement members come into close contact with, the cylindrical hole, also being constructed so that, within a range of tolerance for an internal diameter of the cylindrical hole, the pair of engagement members are capable of being elastically deformed in a direction to increase their external diameter until the pair of engagement members come into close contact with the inner circumferential surface of the cylindrical hole.

Various optional compositions may be employed with the present invention as described below.

(1) The taper engagement mechanism may comprise a pair of tapered slide surfaces that are formed parallel to the second direction on opposite side portions in the first direction of the insertion shaft member, and a pair of tapered engagement surfaces that are formed on the pair of engagement members so as to be in surface contact with those tapered slide surfaces.

(2) In (1) above, each of the engagement members may have the tapered engagement surface formed on its one side portion, a smooth partial cylindrical positioning engagement surface formed on its opposite side from the capered engagement surface and capable of engaging with the cylindrical hole, and a flange portion formed at its lower end portion.

(3) In (2) above, the movement permitting holding mechanism may comprise: a reference reception aperture formed in the main body member so as to pass the insertion shaft member, and having an elliptical shape in plan view with its length direction in the second direction; a bottom surface of the reference reception aperture that supports lower end surfaces of the pair of flange portions so that they cannot move downward; a pair of reference slide surfaces that are formed on a pair of vertical side wall surfaces of the reference reception aperture, parallel to the second direction; and a pair of movable slide surfaces formed on the pair of flange portions so as to be capable of sliding against the pair of reference slide surfaces in surface contact therewith.

(4) In (2) above, the movement permitting holding mechanism may comprise: a reference reception aperture formed in the main body member so as to pass the insertion shaft member, and having an elliptical shape in plan view with its length direction in the second direction; a pair of reference slide surfaces that are formed on a pair of side wall surfaces of the reference reception aperture, parallel to the second direction, and moreover formed in shapes that are inclined so that the distance between them becomes greater going upward; a movable reference member that is installed in the reference reception aperture so as to be capable of shifting in the second direction, and through which the insertion shaft member passes; and a bottom surface of the reference reception aperture that supports a lower end surface of the movable reference member so that it cannot move downward; and the movable reference member comprises: a bottom wall having an elongated aperture through which the insertion shaft member passes so as to be relatively shiftable in the second direction, and a lower end surface of which is supported by the bottom surface; a pair of movable slide surfaces that are formed so as to be capable of sliding against the pair of reference slide surfaces in surface contact therewith; and a circular concave portion to which the pair of flange portions are engaged in a state in which the pair of tapered engagement surfaces are engaged with the pair of tapered slide surfaces of the insertion shaft member, and that supports lower end surfaces of the pair of flange portions so that they cannot move downward.

(5) In (2) above, an internal cylindrical hole may be formed in the main body member with its upper end connecting to a lower end of the reference reception aperture, and having a diameter smaller than that of the reference reception aperture; and an annular flange is formed at the lower portion of the insertion shaft member and is installed in the internal cylindrical hole so as to be capable of moving upward and downward therein.

(6) In (5) above, there may be characterized by comprising a valve hole formed in the bottom wall portion of the internal cylindrical hole and connected to a pressurized air supply passage, and a valve face portion that is formed on the annular flange so as to block up the valve hole when the insertion shaft member has reached its lower limit position; and in that a poor positioning defection means is provided that detects a poor positioning state in which the insertion shaft member has reached its lower limit position via air pressure of pressurized air in the pressurized air supply passage.

(7) In (2) above, there may be characterized in that a fixing ring is provided that is fixed in an installation aperture at a top of the main body member and is fitted over an outside of the insertion shaft member and the pair of engagement members with some play therebetween, and that contacts against the pair of flange portions from above.

(8) In (2) above, there may be characterized in that a scraper made from an elastic material is provided that is fitted over the outside of the insertion shaft member and the pair of engagement members and is installed in the installation aperture and held therein by the fixing ring, and adapted so that, during the non-positioning state when the insertion shaft member is positioned at its upper limit position, the pair of engagement members are centered by the scraper while their diameter is constricted.

(9) In (8) above, there may be characterized in that a pressurized air supply passage and an air conduction passage that is connected to the pressurized air supply passage and that is capable of conducting pressurized air to a lower surface side of the scraper are provided in the main body member; and ingress of foreign matter is prevented by ejecting pressurized air supplied from the pressurized air supply passage to the air conduction passage from a clearance between the insertion shaft member and the engagement member and the scraper.

(10) The present invention presents another positioning device that, by engaging an insertion shaft member that is provided to a base member to be a reference side into a cylindrical hole of a workpiece so as to contact closely via engagement members, is capable of positioning the workpiece in all directions orthogonal to a vertical axis of the insertion shaft member, characterized by comprising: a main body member fixed to the base member; the insertion shaft member, that is installed to the main body member and whose upper end portion projects upward from an upper side of the main body member; a fluid pressure cylinder capable of driving the insertion shaft member upward and downward; a plurality of engagement members that are disposed around an external circumference of the insertion shaft member; a taper engagement mechanism that, by shifting the insertion shaft member downward with respect to the plurality of engagement members with the fluid pressure cylinder, causes the plurality of engagement members to shift so that their diameter increases; and a movement prohibiting holding mechanism that, along with supporting the plurality of engagement, members so that they cannot move downward, also holds them so that they cannot shift in any direction; and further characterized by, along with being constructed so that, after the upper end portion of the insertion shaft member and the upper portions of the plurality of engagement members have been inserted into the cylindrical hole of the workpiece, the external diameter of the plurality of engagement members is increased via the taper engagement mechanism by the insertion shaft member being driven downward by the fluid pressure cylinder so that the plurality of engagement members come into close contact with the cylindrical hole, also being constructed so that, within a range of tolerance for the internal diameter of the cylindrical hole, the plurality of engagement members are capable of being elastically deformed in the direction to increase their external diameter until the plurality of engagement members come into close contact with the inner circumferential surface of the cylindrical hole.

According to the present invention, the cylindrical hole in the workpiece can be positioned in the first direction, while it is permitted to shift in the second direction. And, since the cylindrical hole in the workpiece is positioned in the state in which the pair of engagement members are being supported by the movement permitting holding mechanism so that they cannot move downward, and since during positioning no force acts on the workpiece in the downward direction, accordingly shifting or deformation of the workpiece does not take place.

Moreover, since it is arranged for the pair of engagement members to be expanded diametrically via the taper engagement mechanism, and since, with it being possible to make the amount of diametrical expansion of the pair of engagement members large, it is possible for the pair of engagement members to deform elastically in the direction to increase their diameter within the range of tolerance for the internal diameter of the cylindrical hole, and since therefore it is possible to set the difference between the external diameter of the pair of engagement members in their reduced diameter state and the internal diameter of the cylindrical hole to be quite large, accordingly it is possible to insert the insertion shaft member and the pair of engagement members into the cylindrical hole in the workpiece rapidly and in a simple and easy manner. Furthermore, it is also possible to increase the tolerance for the internal diameter of the cylindrical hole.

According to composition (1) above, the taper engagement mechanism is a construction having a simple structure, including the pair of tapered slide surfaces and the pair of tapered engagement surfaces.

According to composition (2) above, the engagement members are constructions having a simple structure, including the tapered engagement surface, the smooth partial cylindrical positioning engagement surface, and the flange portion.

According to composition (3) above, since the movement permitting holding mechanism has the reference reception aperture that is formed in the main body member and that has an elliptical shape in plan view with its length direction in the second direction, the bottom surface, the pair of reference slide surfaces, and the pair of movable slide surfaces that are formed on the flange portions of the pair of engagement members, accordingly it is possible to hold the pair of engagement members so that they are movable in the second direction by the pair of movable slide surfaces sliding against the pair of reference slide surfaces.

According to composition (4) above, since the movement permitting holding mechanism has the reference reception aperture formed in the main body member and having an elliptical shape in plan view with its length direction in the second direction, the bottom surface thereof, the pair of reference slide surfaces, and the movable reference member that is received in the reference reception aperture, and also the movable reference member has the bottom wall that is supported by the bottom surface, the pair of movable slide surfaces that are capable of sliding against the pair of reference slide surfaces, and the circular concave portion by which the flange portions of the pair of engagement members are contained and supported so that they cannot move downward, accordingly it is possible to hold the pair of engagement members so as to be movable in the second direction together with the movable reference member.

Moreover, since the pair of reference slide surfaces are formed in shapes that are inclined so that the distance between them becomes greater going upward, and since it is possible always to maintain the state of close contact between the pair of reference slide surfaces and the pair of movable slide surfaces, accordingly it is possible to stabilize the positioning accuracy.

According to composition (5) above, since the annular flange at the lower portion of the insertion shaft member is installed in the internal cylindrical hole that is connected to the lower end of the reference reception aperture so as to be capable of moving upward and downward therein, accordingly it is possible to guide the lower portion of the insertion shaft member in the upward and downward direction.

According to composition (6) above, since the poor positioning detection means that detects the poor positioning state in which the insertion shaft member has reached its lower limit position is provided, accordingly it is possible to detect the poor positioning state.

According to composition (7) above, since the fixing ring that is fixed in the installation aperture of the main body member is contacted against the flange members of the pair of engagement members from above, accordingly it is possible to regulate the upward shifting of the flange portions with the fixing ring.

According to composition (8) above, since the scraper that is made from an elastic material is fitted over the outside of the insertion shaft member and the pair of engagement members and is held by the fixing ring, accordingly it is possible to prevent the ingress of foreign matter with the scraper. Moreover, during the non-positioning state, it is possible to center the pair of engagement members by the scraper while their diameter is constricted.

According to composition (9) above, by ejecting pressurized air from the clearance between the outer circumferential surface of the insertion shaft member and the scraper, it is possible reliably to prevent the ingress of foreign matter.

According to another invention above, the cylindrical hole in the workpiece can be positioned in all directions orthogonal to the vertical axis of the insertion shaft member.

And, since the cylindrical hole in the workpiece is positioned in the state in which the plurality of engagement members are being supported by the movement permitting holding mechanism so that they cannot move downward, and since during positioning no force acts on the workpiece in the downward direction, accordingly shifting or deformation of the workpiece does not take place.

Moreover, since it is arranged for the plurality of engagement members to be expanded diametrically via the taper engagement mechanism, and since, with it being possible to make the amount of diametrical expansion of the plurality of engagement members large, it is possible for the plurality of engagement members to deform elastically in the direction to increase their diameter within the range of tolerance for the internal diameter of the cylindrical hole, and since therefore it is possible to set the difference between the external diameter of the plurality of engagement members in their reduced diameter state and the internal diameter of the cylindrical hole to be quite large, accordingly it is possible to insert the insertion shaft member and the plurality of engagement members into the cylindrical hole in the workpiece rapidly and in a simple and easy manner. Furthermore, it is also possible to increase the tolerance for the internal diameter of the cylindrical hole.

DESCRIPTION OF THE PREFERRED EMBODIMENTS

The present invention will now be explained on the basis of several specific embodiments thereof.

Embodiment 1

This specific embodiment of the present invention will now be explained with reference to the drawings.

Figure 1:
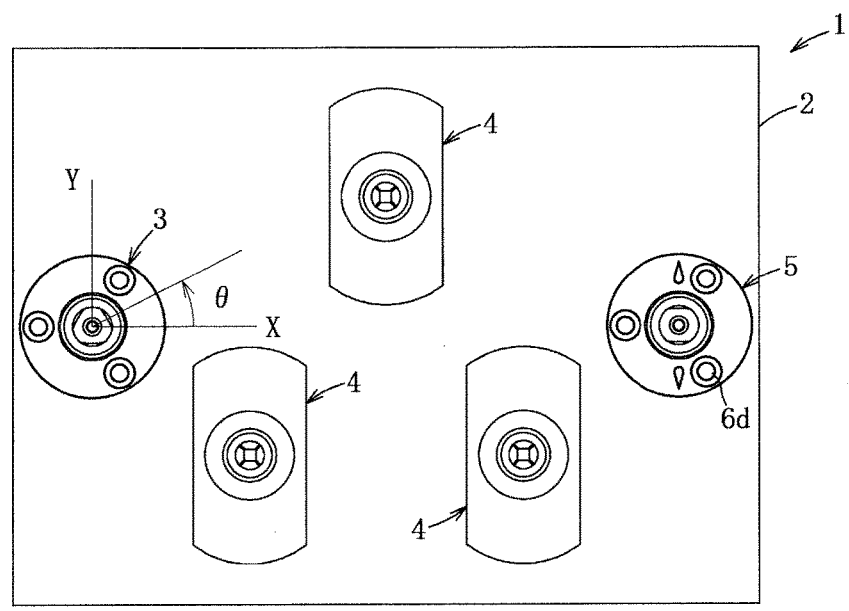
FIG. 1 is a plan view of a positioning system according to a first specific embodiment of the present invention.
Figure 2:
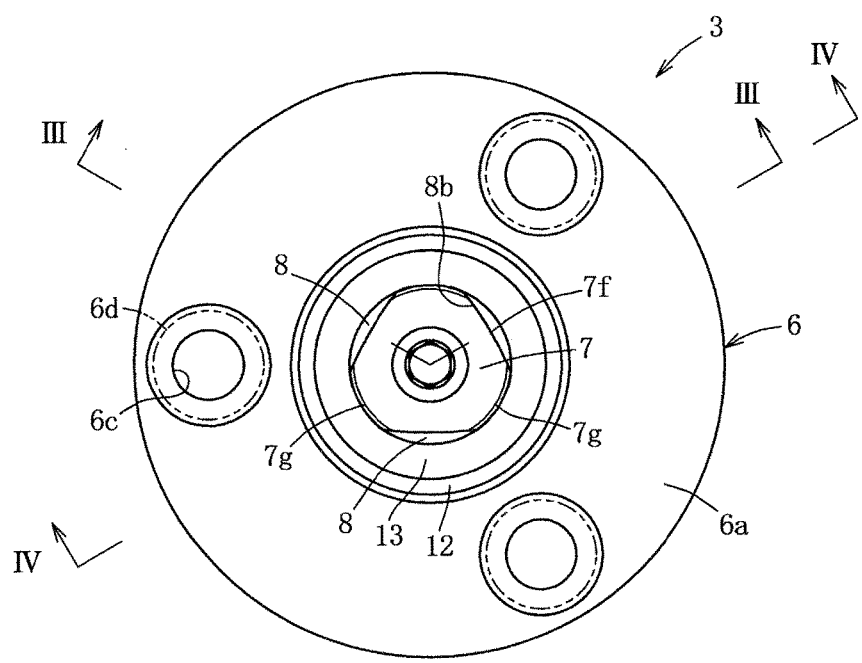
FIG. 2 is a plan view of a first positioning device.

As shown in FIG. 1, a positioning system 1 is a device for positioning a workpiece pallet (corresponding to a workpiece W), which is a movable member, with respect to a base member 2, which is a table of a machining center (i.e. a numerically controlled machine tool), accurately in all horizontal directions.

FIG. 1 is a plan view showing the base member 2 and a plurality of positioning devices 3, 4, and 5 that are equipped thereto. As shown in FIG. 1, to the base member 2, there are provided: a first positioning device 3 that positions a workpiece W which is set in a position close above it (refer to FIGS. 3 and 4) in the X direction and the Y direction in the horizontal plane (i.e. in all horizontal directions), a group of three height direction positioning devices 4 that position the workpiece W in the Z direction (i.e. in the vertical direction), and a second positioning device 5 that positions the workpiece W in the horizontal rotational direction (i.e. in the θ direction) about the first positioning device 3 as a center.

The first positioning device 3 is disposed at a portion of the base member 1 near one end thereof (its left end), and the second positioning device 5 is disposed at a portion of the base member 1 near its other end (its right end). In this specific embodiment, the line which connects the axes of the first and second positioning devices 3, 5 is parallel to the X direction. It should be understood that the way in which the first and second positioning devices 3, 5 are arranged is not limited to being that described above.

The workpiece W can be positioned in all horizontal directions with the first positioning device 3 and the second positioning device 5. Explanation of the positioning devices 4 that operate in the height direction is omitted; herein, only the first and second positioning devices 3, 5 will be explained.

First, the first positioning device 3 will be explained on the basis of FIGS. 2 through 7.

Figure 3:
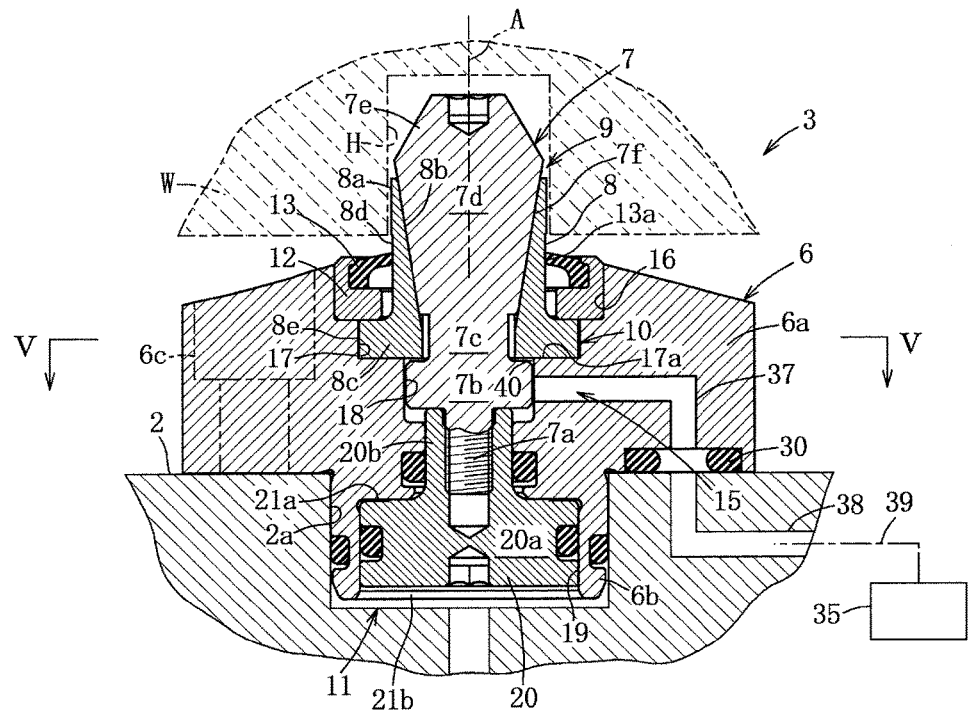
FIG. 3 is a sectional view along lines III-III of FIG. 2.
Figure 4:
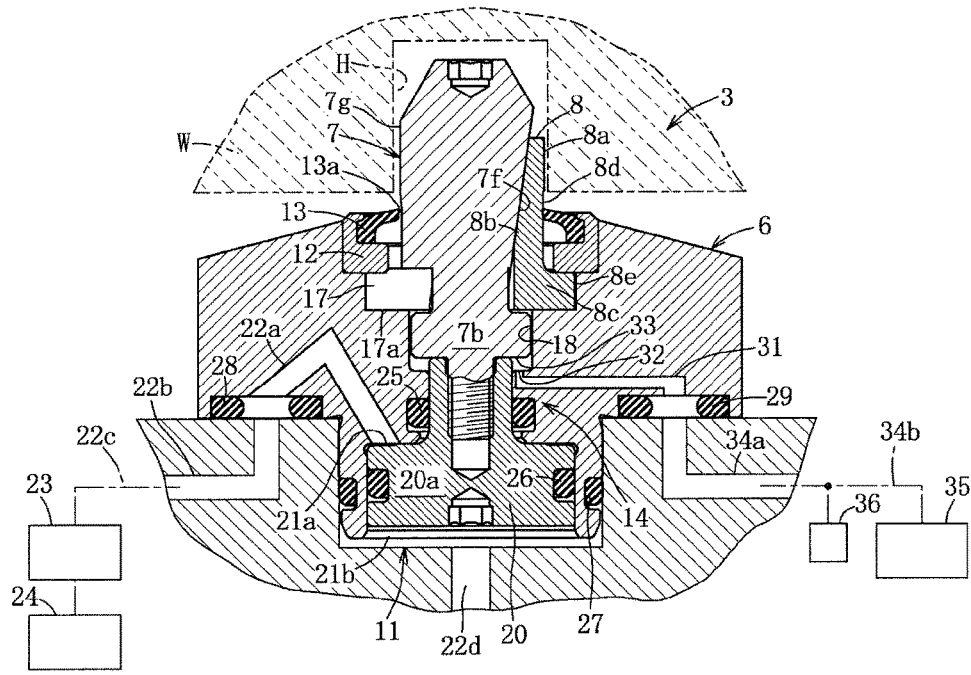
FIG. 4 is a sectional view along lines IV-IV of FIG. 2.
Figure 5:
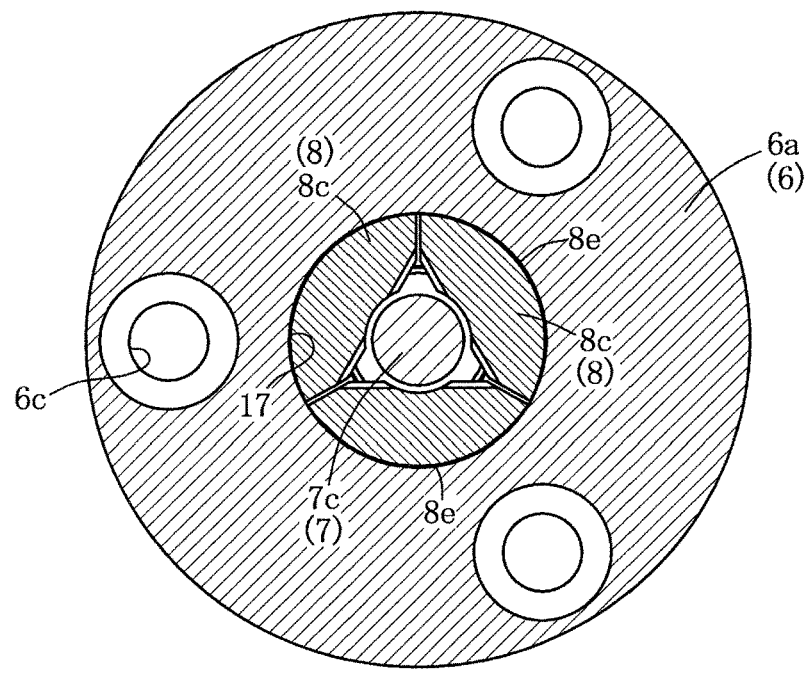
FIG. 5 is a sectional view along lines V-V of FIG. 3.
Figure 6:
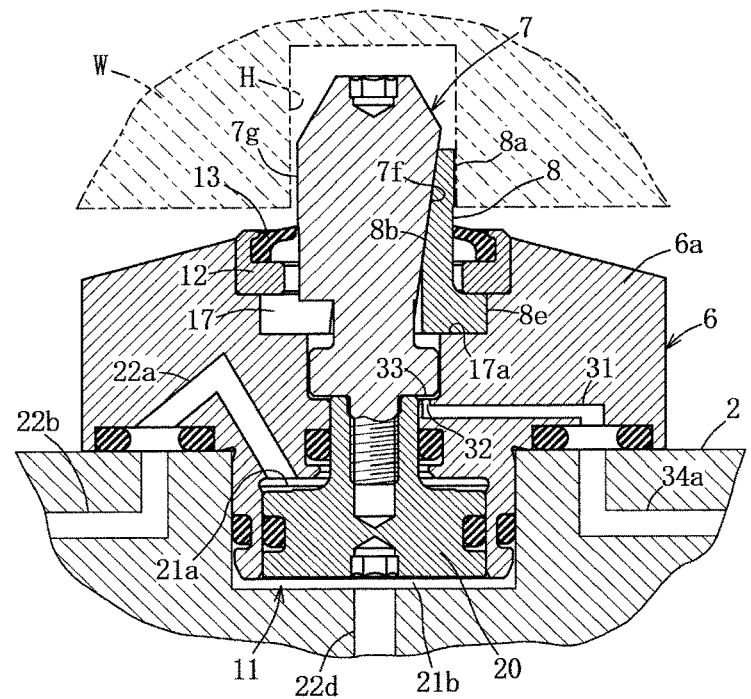
FIG. 6 is a figure corresponding to FIG. 4, during the positioning state.
Figure 7:
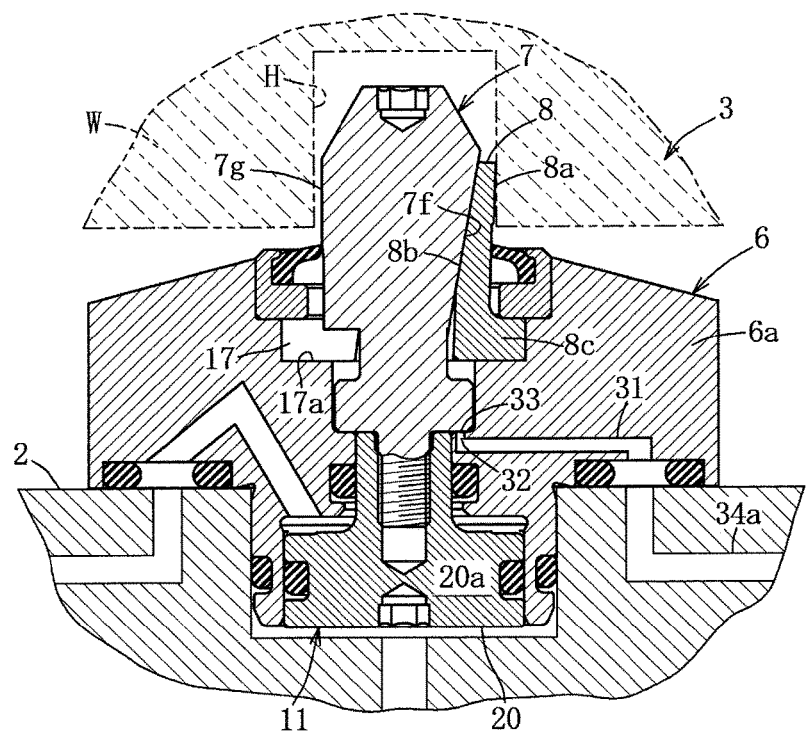
FIG. 7 is a figure corresponding to FIG. 4, when an insertion shaft member is in its lower limit position.
Figure 8:
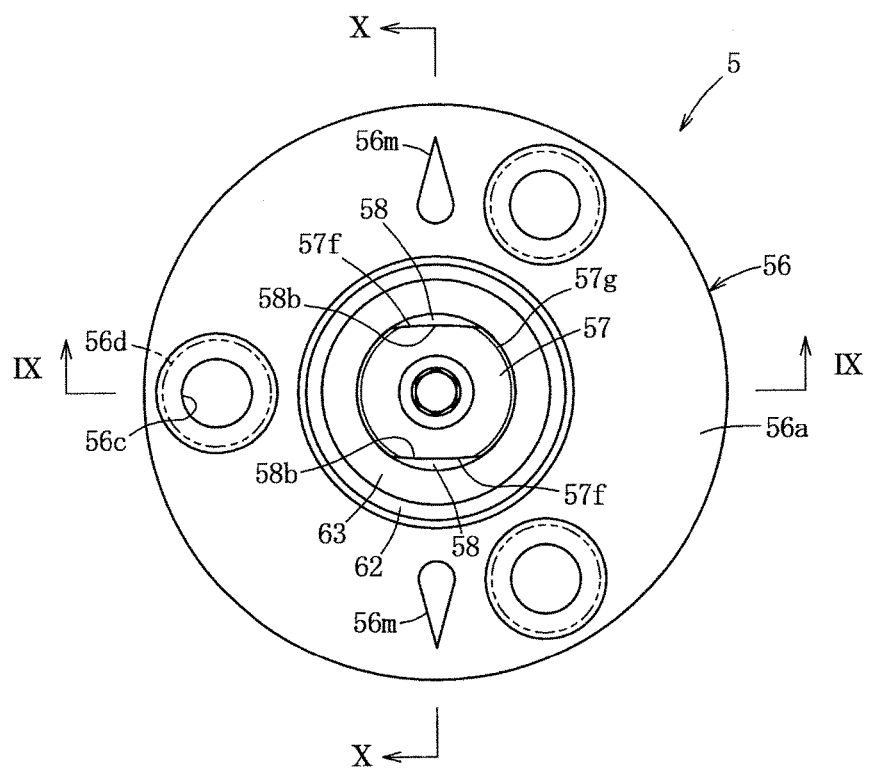
FIG. 8 is a plan view of a second positioning device.

FIGS. 3 and 4 show a non-positioning state in which a piston member 20 of a hydraulic cylinder 11 and an insertion shaft member 7 are at their upper limit positions, while FIG. 7 shows a state in which the piston member 20 of the hydraulic cylinder 11 and the insertion shaft member 7 have moved through their full strokes and have arrived at their lower limit positions. Moreover, FIG. 6 shows a state in which positional determination has been performed normally, and in this state the piston member 20 of the hydraulic cylinder 11 and the insertion shaft member 7 are positioned at intermediate positions between their upper limit positions and their lower limit positions.

As shown in FIGS. 2 through 5, the first positioning device 3 comprises a main body member 6 that is fixed to the base member 2 to be a reference side, the insertion shaft member 7, three engagement members 8, a taper engagement mechanism 9, a movement prohibiting holding mechanism 10, a hydraulic cylinder 11, a fixing ring 12, a scraper 13, a poor positioning detection means 14, an air blowing mechanism 15, and so on.

The first positioning device 3 is a device that, after the upper end portion of the insertion shaft member 7 and the upper portions of the three engagement members 8 (i.e. their upper half portions) have been inserted from below into a cylindrical hole H in the bottom portion of the workpiece W, positions the cylindrical hole H of the workpiece W in all directions perpendicular to the axis A of the insertion shaft member 7 by expanding the three engagement members 8 in the diametrical direction so that they become tightly fitted into the cylindrical hole H.

The main body member 8 has a flange portion 6a for fixing and a tubular portion 6b, with the lower surface of the flange portion 6a being formed as a horizontal reference surface. The tubular portion 6b is installed into a cylindrical hole 2a that is formed in the base member 2 in an attitude with its axis vertical, and, in the state in which the lower surface of the flange portion 6a is contacted against the upper surface of the base member 2, the main body member 6 is positioned at high accuracy and is fixed to the base member 2 by fixing bolts 6d being passed through three respective bolt holes 6c.

The insertion shaft member 7 is arranged with its axis A in a vertical attitude. The insertion shaft member 7 comprises a connection shaft 7a that is connected to a rod portion 20b of the piston member 20 of the hydraulic cylinder 11 by being screwed thereinto and engaged therewith, an annular flange 7b that extends upward from the upper end of the connection shaft 7a, a circular cylindrical portion 7c that extends upward from the upper side of the annular flange 7b, a tapered shaft portion 7d that extends upward from the upper end of the circular cylindrical portion 7c, and a tapered guide portion 7e that extends upward from the upper end of the tapered shaft portion 7d. The connection shaft 7a, the annular flange 7b, and the circular cylindrical portion 7c are formed on the lower portion of the insertion shaft member 7.

The insertion shaft member 7 is installed in the main body member 6 in a state in which its upper end portion (i.e. the upper end portion of its tapered shaft portion 7d and its tapered guide portion 7e) projects upward from the upper side of the main body member 6.

On the external circumferential portion of the insertion shaft member 7, three smooth tapered slide surfaces 7f are formed at positions dividing the circumference into three equal parts, with three partial circular cylindrical surfaces 7g being formed as positioned between adjacent ones of the tapered slide surfaces 7f. The tapered slide surfaces 7f are inclined with respect to the vertical so as to become further away from the axis A of the shaft member 7 with going upward.

The three engagement members 8 are arranged around the external circumference of the insertion shaft member 7, with each of them opposing a respective one of the three tapered slide surfaces 7f. The upper half portions of the engagement members 8 project upward from the upper side of the main body member 6.

Each of the engagement members 8 has a tapered engagement surface 8b that is formed so as to be in surface contact with a corresponding one of the tapered slide surfaces 7f, a flange portion 8c at the lower end of the surface 8b, a smooth positioning engagement surface 8a that is formed as a partial cylinder and that is capable of closely engaging to the cylindrical hole H in the workpiece W, and a partial cylindrical surface 8d that leads downward from the lower end of the positioning engagement surface 8a. The flange portion 8c has a reference surface 8e that is formed as a partial cylinder on its external periphery. The lower end surface of the flange portion 8c contacts against a horizontal bottom surface 17a of a reference reception aperture 17, so that the flange portion 8c cannot move downward. The external diameter of the three partial cylindrical surfaces 7g is set so as to be, in the non-positioning state, slightly smaller than the external diameter of the three positioning engagement surfaces 8a.

The taper engagement mechanism 9 is a construction that shifts the three engagement members 8 in the direction to increase their diameter by shifting the insertion shaft member 7 with the hydraulic cylinder 11 relatively downward with respect to the three engagement members 8. This taper engagement mechanism 9 comprises the three tapered slide surfaces 7f and the three tapered engagement surfaces 8b.

In order from above, in the main body member 6, there are formed a top installation aperture 16 that is circular in plan view, the reference reception aperture 17 (also circular in plan view) which has a smaller diameter than the aperture 16, and an internal cylindrical hole 18 which has a smaller diameter than the aperture 17, all of which communicate with one another. The lower end of the installation aperture 16 leads to the upper end of the reference reception aperture 17, and the upper end of the internal cylindrical hole 18 leads to the lower end of the reference reception aperture 17.

The movement prohibiting holding mechanism 10 is a device that, along with supporting the three engagement members 8 so that they cannot move downward, also holds them so that they cannot shift in any horizontal direction. This movement prohibiting holding mechanism 10 includes the reference reception aperture 17 that is formed in the main body member 8 so as to pass the insertion shaft member 7, the bottom surface 17a of the reference reception aperture 17 that supports the lower end surfaces of the three flange portions 8c so that they cannot move downward, the cylindrical inner circumferential surface of the reference reception aperture 17, and the partial cylindrical reference surfaces 8e at the external circumferences of the flange portions 8c.

In the state shown in FIGS. 3 and 4 (the non-positioning state in which the insertion shaft member 7 is positioned at its upper limit position), the circular cylindrical portion 7c of the insertion shaft member 7 passes through the reference reception aperture 17, the flange portions 8c of the engagement members 8 are received in the reference reception aperture 17 in the state of being engaged therewith, and the partial cylindrical reference surfaces 8e at the external circumferences of the flange portions 8c are approached toward the inner circumferential surface of the reference reception aperture 17 with minute clearances therebetween. And, in the state shown in FIG. 6 (the state in which the insertion shaft member 7 is positioned slightly lower), the partial cylindrical reference surfaces 8e at the external circumferences of the flange portions 8c are closely contacted against the inner circumferential surface of the reference reception aperture 17, so that the three engagement members 8 are in their reference positions.

The fixing ring 12, which is shaped as a letter L in cross section, is pressed into and fixed in the installation aperture 16, and this fixing ring 12 contacts against the upper surfaces of the flange portions 8c and restrains the flange portions 8c so that they cannot shift upward. The scraper 13, which is made from an elastic material, is fitted over the outside of the insertion shaft member 7 and the three engagement members 8 so as to be almost in close contact therewith, and this scraper 13 is installed within the fixing ring 12 and is held by the fixing ring 12. This structure ensures that, during the non-positioning state in which the insertion shaft member 7 is at its upper limit position, the three engagement members 8 are squeezed diametrically inward and centered by the scraper 13.

The hydraulic cylinder 11 is a device for driving the insertion shaft member 7 to raise and lower it. The hydraulic cylinder 11 includes a cylindrical hole 19 that is formed in the tubular portion 6b of the main body member 6 so as to be oriented vertically, and the aforementioned piston member 20 that includes a piston portion 20a which is installed in this cylindrical hole 19 so as to be capable of moving upward and downward therein; and a first hydraulic chamber 21a for driving the insertion shaft member 7 downward is defined above the piston portion 20a within the cylindrical hole 19, while a second hydraulic chamber 21b for driving the insertion shaft member 7 upward is defined below the piston portion 20a.

As shown in FIG. 4, the first hydraulic chamber 21a is connected to a hydraulic pressure supply source 23 via a hydraulic pressure passage 22a within the main body member 8, a hydraulic pressure passage 22b within the base member 2, and an external hydraulic pressure passage 22c. And the second hydraulic chamber 21b is connected to the hydraulic pressure supply source 23 via a hydraulic pressure passage 22d within the base member 2 and an external hydraulic pressure passage (not shown in the figure). Incidentally, seal members 25 through 27 and other seal members 28 through 30 are provided for sealing hydraulic pressure in the first and second hydraulic chambers 21a, 21b. Moreover, the hydraulic pressure supply source 23 is electrically connected to a control unit 24. By the way, in this specific embodiment, "hydraulic pressure" means pressurized oil.

With this first positioning device 3 it is arranged that, after the upper end portion of the insertion shaft member 7 and the upper half portions of the three engagement members 8 have been inserted into the cylindrical hole H of the workpiece W with the insertion shaft member 7 in the state of being positioned at its upper limit position, then, by driving the insertion shaft member 7 downward with the hydraulic cylinder 11, not only are the three engagement members 8 shifted via the taper engagement mechanism 9 so that their diameter increases and their positioning engagement surfaces 8a are closely contacted against the cylindrical hole H, but also, within the range of tolerance for the internal diameter of the cylindrical hole H, the three engagement members 8 can be elastically deformed in the direction to increase their external diameter until the position engagement surfaces 8a of the three engagement members 8 contact closely against the inner circumferential surface of the cylindrical hole H.

As shown in FIG. 4, the poor positioning detection means 14 comprises a valve hole 32 that is formed in the bottom wall portion of the internal cylindrical hole 18 and that moreover is connected to a pressurized air supply passage 31, and a valve face 33 that is formed on the lower surface of the annular flange 7b so as to block up the valve hole 32 when the insertion shaft member 7 reaches its lower limit position. The pressurized air supply passage 31 is connected to a pressurized air supply source 35 via an air passage 34a within the base member 2 and an external air passage 34b. A pressure switch 36 (or a pressure sensor) is connected to the external air passage 34b, and the pressurized air supply source 35 and the pressure switch 36 are electrically connected to the control unit 24.

During the non-positioning state in which the insertion shaft member 7 is in its upper limit position and during a normal positioning state in which the insertion shaft member 7 is positioned at an intermediate position between its upper limit position and its lower limit position, the pressure switch 36 detects the air pressure as "low", since the valve face 33 does not block up the valve hole 32. However, if poor positioning has occurred and the insertion shaft member 7 has reached its lower limit position, then the pressure switch 36 detects the air pressure as "high", since the valve face 33 does block up the valve hole 32.

The air blowing mechanism 15 is a device that prevents ingress of foreign matter by ejecting pressurized air from a clearance 13a defined between the insertion shaft member 7 and the three engagement members 8 and the scraper 13.

This air blowing mechanism 15 comprises a pressurized air supply passage 37 that is formed in the main body member 8, an air passage 38 internal to the base member 2, an external air passage 39 that is connected to the pressurized air supply source 35, and an air conduction passage 40 that is connected to the pressurized air supply passage 37 and that is capable of conducting pressurized air to the lower surface side of the scraper 13.

The air blowing mechanism 15 is constructed so as to eject pressurized air supplied from the pressurized air supply passage 37 to the air conduction passage 40 from the clearance 13a between the outer circumferential surfaces of the insertion shaft member 7 and the three engagement members 8 and the scraper 13. The air conduction passage 40 consists of a clearance between the main body member 6 and the insertion shaft member 7, clearances between the main body member 6 and the engagement members 8, clearances between the insertion shaft member 7 and the engagement members 8, a clearance between the insertion shaft member 7 and the fixing ring 12, and so on.

Next, the operation of the first positioning device 3 and the advantages that it provides will be explained.

In the non-positioning state in which the piston member 20 and the insertion shaft member 7 are in their upper limit positions, due to the action of the taper engagement mechanism 9, the three engagement members 8 are put in a state in which their diameter can be reduced, and the scraper 13 centers the three engagement members 8 while reducing their diameter. In this state, the workpiece W with its cylindrical hole H is lowered down from above, and the upper end portion of the insertion shaft member 7 and the upper portions of the three engagement members 8 are inserted into the cylindrical hole H while being guided by the tapered guide portion 7e of the insertion shaft member 7.

Next, when the piston member 20 of the hydraulic cylinder 20 is driven downward and the insertion shaft member 7 is driven downward, the three engagement members 8 do not move downward because they are supported from below by the bottom surface 17a, and accordingly their three tapered engagement surfaces 8b are pushed and forced to expand diametrically by the three tapered slide surfaces 7f of the taper engagement mechanism 9, and thereby the partial cylindrical reference surfaces 8e of the three flange portions 8c are brought a state of being in close contact with the inner circumferential surface of the reference reception aperture 17, and further the three engagement members 8 are then elastically deformed in the direction to increase their external diameter, within the range of tolerance of the cylindrical hole H, until their positioning engagement surfaces 8a come into close contact with the inner circumferential surface of the cylindrical hole H; and thereby the cylindrical hole H is positioned at high accuracy.

At this time, as shown in FIG. 6, due to the taper engagement mechanism 9, the insertion shaft member 7 reaches a locked state at an intermediate position between its upper limit position and its lower limit position, and, since the valve face 33 does not block up the valve hole 32, accordingly the pressure switch 36 detects the air pressure as being "low". For this reason, it is possible to detect that positioning has been performed normally. On the other hand, if the internal diameter of the cylindrical hole H is excessively large due to the manufacturing error of the cylindrical hole H being greater than the range of tolerance for its internal diameter, then, as shown in FIG. 7, the insertion shaft member 7 lowers to its lower limit position, and the pressure switch 38 detects the air pressure as being "high"

since the valve face 33 blocks up the valve hole 32. For this reason, it is possible to detect that poor positioning has occurred.

Even if the internal diameter of the cylindrical hole H is excessively large due to a workpiece of a different type from the anticipated workpiece W being put into place, it is still possible to detect poor positioning in a similar manner to that described above, since the insertion shaft member 7 drops to its lower limit position, and the pressure switch 36 detects the air pressure as being "high".

Since the cylindrical hole H of the workpiece W is positioned in the state in which the three engagement members 8 are supported by the movement prohibiting holding mechanism 10 so that they cannot move downwards, accordingly the workpiece W is not shifted or deformed during positioning, since no force in the downward direction acts on the workpiece W. For this reason, it is possible to prevent decrease of accuracy during machining of the workpiece W, or of a subject for processing that is fixed to the workpiece W.

Since it is arranged for the three engagement members 8 to be expanded diametrically via the taper engagement mechanism 9, it is possible to increase the amount of diametrical expansion of the three engagement members 8 due to the three engagement members 8 being elastically deformed in the direction to increase their external diameter within the range of tolerance for the internal diameter of the cylindrical hole H, and since it is possible to set the difference between the external diameter of the three engagement members 8 in their reduced diameter state and the internal diameter of the cylindrical hole H to be relatively large (for example to around 0.3 to 0.5 mm), accordingly not only is if possible to insert the insertion shaft member 7 and the three engagement members 8 rapidly into the cylindrical hole H in the workpiece W in a simple and easy manner, but also it is possible to increase the tolerance for the internal diameter of the cylindrical hole H.

Moreover, no foreign matter such as swarf or the like can get into the interior of the mechanism, since pressurized air is blown by the air blowing mechanism 15 and is ejected from the clearance 13a between the insertion shaft member 7 and the outer peripheral surfaces of the three engagement members 8 and the scraper 13.

Next, the second positioning device 5 will be explained on the basis of FIGS. 1 and 8 through 13.

Figure 9:
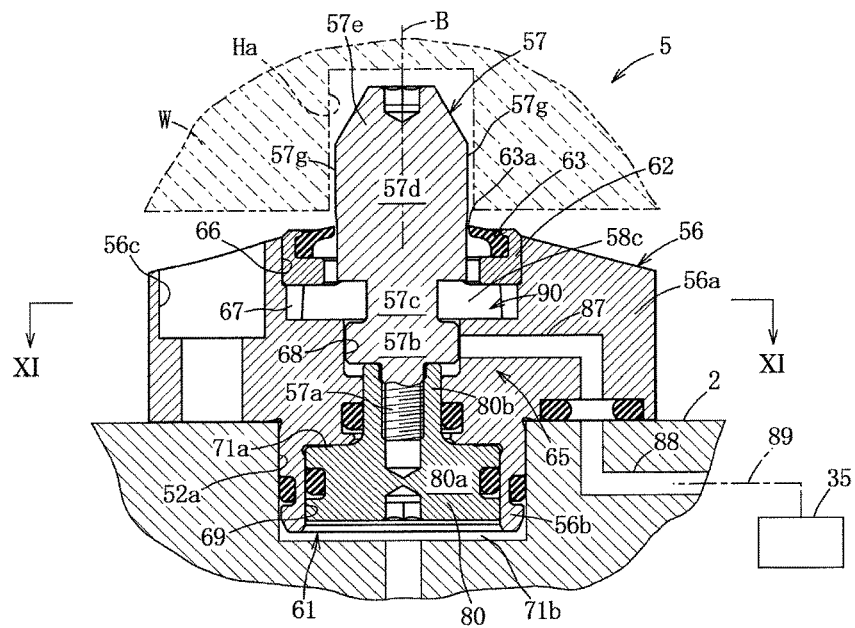
FIG. 9 is a sectional view along lines IX-IX of FIG. 8.
Figure 10:
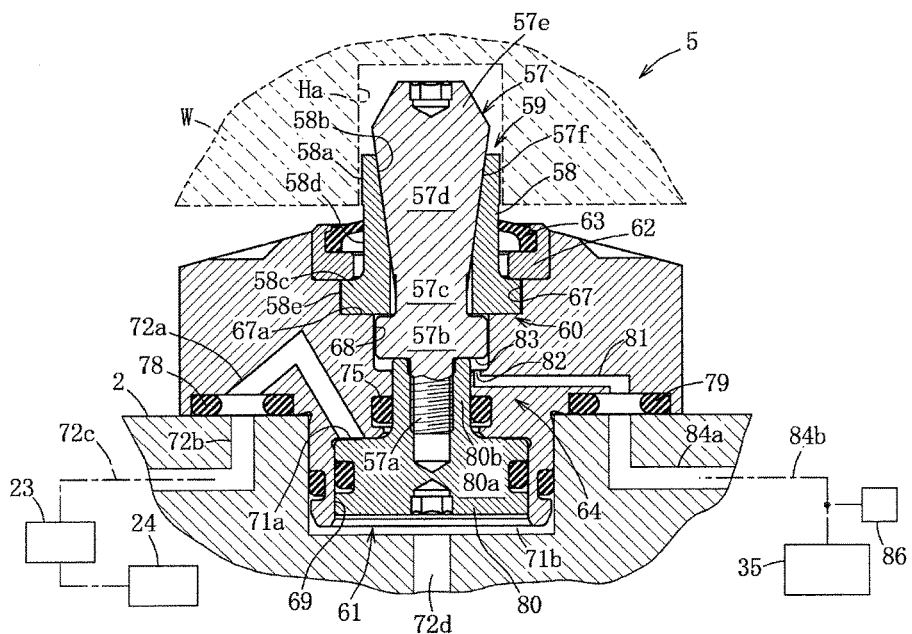
FIG. 10 is a sectional view along lines X-X of FIG. 8.
Figure 12:
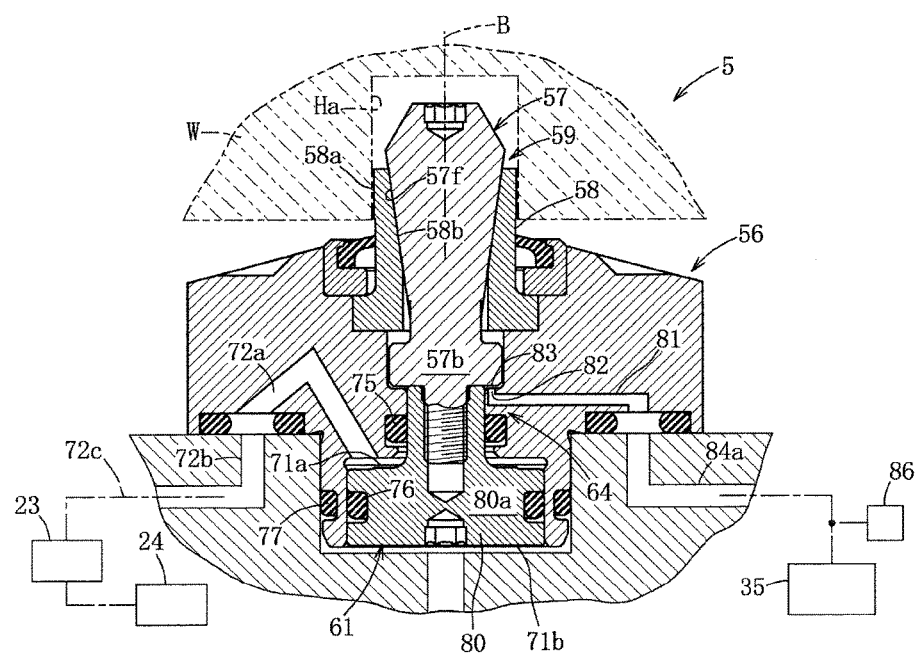
FIG. 12 is a figure corresponding to FIG. 10, during the positioning state.
Figure 13:
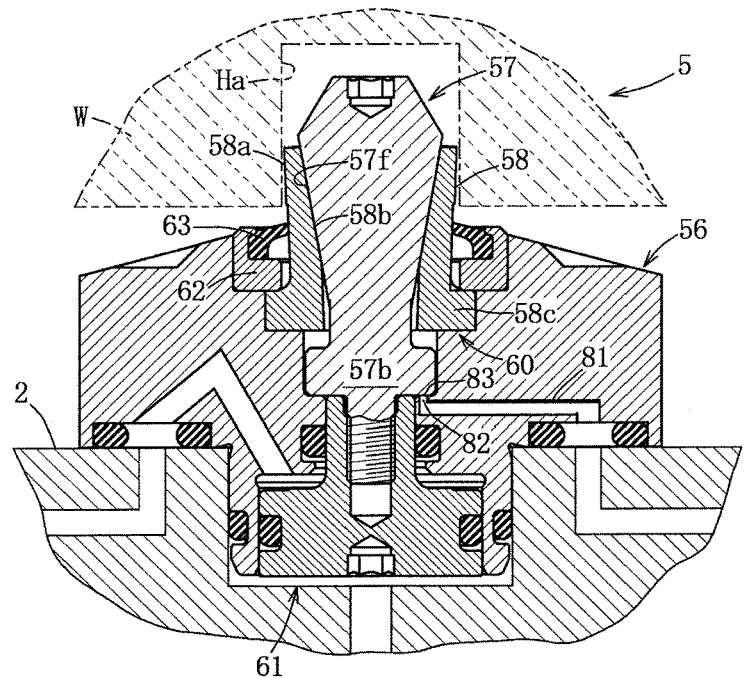
FIG. 13 is a figure corresponding to FIG. 10, when an insertion shaft member is in its lower limit position.
Figure 14:
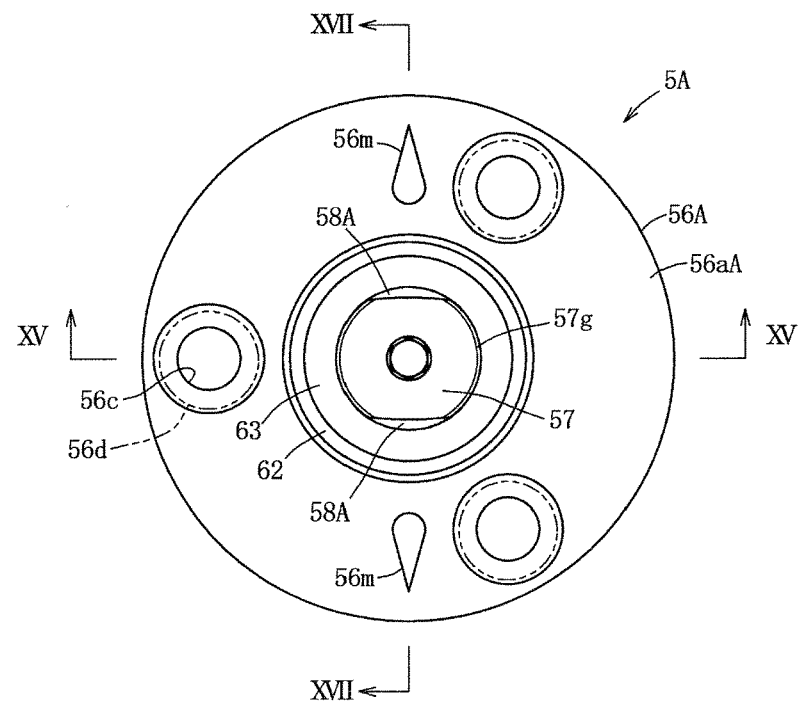
FIG. 14 is a plan view of a second positioning device according to a second specific embodiment.

FIGS. 9 and 10 show a non-positioning state in which a piston member 80 of a hydraulic cylinder 61 and an insertion shaft member 57 are at their upper limit positions, while FIG. 13 shows a state in which the piston member 80 of the hydraulic cylinder 61 and the insertion shaft member 57 have moved through their full strokes and have arrived at their lower limit positions. Moreover, FIG. 12 shows a state in which positioning has been performed normally, and in this state the piston member 80 of the hydraulic cylinder 61 and the insertion shaft member 57 are positioned at intermediate positions between their upper limit positions and their lower limit positions.

As shown in FIGS. 8 through 13, this second positioning device 5 comprises a main body member 56 that is fixed to the base member 2 to be a reference side, the insertion shaft member 57, a pair of engagement members 58, a taper engagement mechanism 59, a movement permitting holding mechanism 60, a hydraulic cylinder 61, a fixing ring 62, a scraper 63, a poor positioning detection means 64, an air blowing mechanism 65, and so on.

This second positioning device 5 is a device that, after the upper end portion of the insertion shaft member 57 and the upper portions of the pair of engagement members 58 (i.e. their upper half portions) have been inserted, from below into a cylindrical hole Ha in the bottom portion of the workpiece W, positions the cylindrical hole Ha of the workpiece W in the Y direction which is orthogonal to the X direction by expanding the pair of engagement members 58 in the diametrical direction so that they become tightly fitted into the cylindrical hole Ha, while still permitting shifting thereof in the X direction which is orthogonal to the axis of the insertion shaft member 57. The Y direction is equivalent to the "first direction" in the claims, while the X direction is equivalent to the "second direction" in the claims.

The main body member 56 has a flange portion 56a for fixing and a tubular portion 56b, with the lower surface of the flange portion 56a being formed as a horizontal reference surface. The tubular portion 56b is installed in an attitude with its axis vertical into a cylindrical hole 52a that is formed in the base member 2, and, in the state in which the lower surface of the flange portion 56a is contacted against the upper surface of the base member 2, the main body member 56 is positioned at high accuracy and is fixed to the base member 2 by fixing bolts 58d being passed through three respective bolt holes 56c. It should be understood that a pair of marks 56m (here, consisting of shallow concave portions) which are formed on the upper surface of the main body member 56 show the positioning direction (in this specific embodiment, the Y direction).

The insertion shaft member 57 is arranged with its axis B in a vertical attitude. The insertion shaft member 57 comprises a connection shaft 57a that is connected to a rod portion 80b of the piston member 80 of the hydraulic cylinder 61 by being screwed thereinto and engaged therewith, an annular flange 57b that extends upward from the upper end of the connection shaft 57a, a circular cylindrical portion 57c that extends upward from the upper side of the annular flange 57b, a tapered shaft portion 57d that extends upward from the upper end of the circular cylindrical portion 57c, and a tapered guide portion 57e that extends upward from the upper end of the tapered shaft portion 57d. The connection shaft 57a, the annular flange 57b, and the circular cylindrical portion 57c are formed on the lower portion of the insertion shaft member 57.

The insertion shaft member 57 is installed in the main body member 56 in a state in which its upper end portion (i.e. the upper half portion of its tapered shaft portion 57d and its tapered guide portion 57e) projects upward from the upper side of the main body member 58. A pair of smooth tapered slide surfaces 57f, which are parallel to the X direction, are formed on the two side portions in the Y direction of the tapered shaft portion 57d of the insertion shaft member 57, and a pair of partial circular cylindrical surfaces 57g are formed on the two side portions in the X direction of the tapered shaft portion 57d of the insertion shaft member 57, thus being positioned between the pair of tapered slide surfaces 57f. The tapered slide surfaces 57f are inclined with respect to the vertical so as to become further away from the axis B of the shaft member 57 with going upward.

The pair of engagement members 58 are arranged on opposite sides of the insertion shaft member 57 in the Y direction so as respectively to oppose its pair of tapered side surfaces 57f. The upper portions of the engagement members 58 project upward from the upper side of the main body member 56. Each of the engagement members 58 has a tapered engagement surface 58b that is formed so as to be in surface contact with the corresponding one of the tapered slide surfaces 57f, a flange portion 58c at its lower end portion, a smooth positioning engagement surface 58a that is formed as a partial cylinder and that is capable of closely engaging to the cylindrical hole Ha in the workpiece W, and a partial cylindrical surface 58d that leads downward from the lower end of the positioning engagement surface 58a. The external diameter of the two partial cylindrical surfaces 57g is set so as to be, during the non-positioning state, slightly smaller than the external diameter of the two positioning engagement surfaces 58a.

Figure 11:
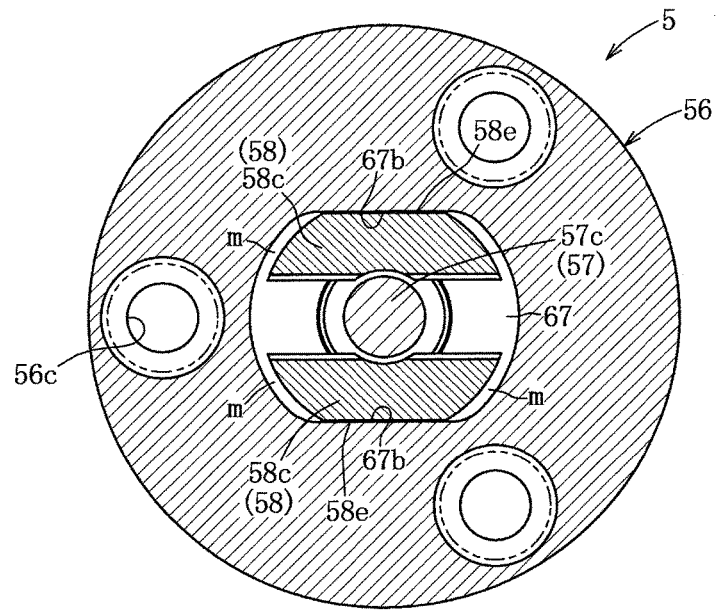
FIG. 11 is a sectional view along lines XI-XI of FIG. 9.

As shown in FIG. 11, a reference reception aperture 67 having, in plan view, an elliptical shape extending along the X direction is formed in the main body member 56, with a pair of reference slide surfaces 67b that are parallel to the X direction being formed on a pair of vertical side wall surfaces of the reference reception aperture 67. The pair of flange portions 58c of the pair of engagement members 58 are formed, in plan view, in shapes close to a letter D, and are contained in the reference reception aperture 67 so as to be movable in the X direction; and a pair of movable slide surfaces 58e are formed on both the sides of the pair of flange portions 58c in the Y direction, so as to be in surface contact with and capable of sliding against the pair of reference slide surfaces 67b. The lower end surfaces of the pair of flange portions 58c are contacted against and are supported by the horizontal bottom surface 67a of the reference reception aperture 67, and thereby are prevented from moving downward.

The taper engagement mechanism 59 is a construction that shifts the pair of engagement members 58 in the direction to increase their diameter by shifting the insertion shaft member 57 with the hydraulic cylinder 61 relatively downward with respect to the pair of engagement members 58. This taper engagement mechanism 59 comprises the pair of tapered slide surfaces 57f and the pair of tapered engagement surfaces 58b.

In order from above, in the main body member 56, there are formed a top installation aperture 66 that is circular in plan view, the reference reception aperture 67 which has a smaller diameter than the aperture 66, and an internal cylindrical hole 68 which has a smaller diameter than the aperture 67, all of which communicate with one another. The lower end of the installation aperture 66 leads to the upper end of the reference reception aperture 67, and the upper end of the internal cylindrical hole 68 leads to the lower end of the reference reception aperture 67.

The movement permitting holding mechanism 60 is a device that, along with supporting the pair of engagement members 58 so that they cannot move downward, also holds them so that they cannot shift in the Y direction, while permitting them to shift in the X direction. This movement permitting holding mechanism 60 includes the reference reception aperture 67 that is formed in the main, body member 56 so as to pass the insertion shaft member 57, the bottom surface 67a of the reference reception aperture 67 that supports the lower end surfaces of the pair of flange portions 58c so that they cannot move downward, the pair of reference slide surfaces 67b of the reference reception aperture 67, and the pair of movable slide surfaces 58e that are formed on the respective pair of flange portions 58c and that are in surface contact with the pair of reference slide surfaces 67b respectively via sliding clearances.

The circular cylindrical portion 57c of the insertion shaft member 57 passes through the reference reception aperture 67, and the pair of flange portions 58c of the pair of engagement members 58 are received in the reference reception aperture 67 so as to be movable in the X direction while not being able to shift in the Y direction; and, in the state shown in FIGS. 9 and 10 (the non-positioning state in which the insertion shaft member 57 is positioned at its upper limit position), clearances m are defined between opposite sides in the X direction of the pair of flange portions 58c and the wall portion of the reference reception aperture 67.

The fixing ring 62, which is shaped as a letter L in cross section, is pressed into and fixed in the installation aperture 66, and the fixing ring 62 contacts against the upper surfaces of the flange portions 58c and restrains the flange portions 58c so that they cannot shift upward. The scraper 63, which is made from an elastic material, is fitted over the outside of the insertion shaft member 7 and the pair of engagement members 58, and this scraper 63 is installed within the fixing ring 62 and is held by the fixing ring 62. This structure ensures that, during the non-positioning state in which the insertion shaft member 57 is at its upper limit position, the pair of engagement members 58 are biased diametrically inward and are centered by the scraper 63.

The hydraulic cylinder 61 is a device for driving the insertion shaft member 57 to raise and lower it. The hydraulic cylinder 61 comprises a cylindrical hole 89 that is formed in the tubular portion 56b of the main body member 56 so as to be oriented vertically, and the piston member 80 that includes a piston portion 80a which is installed in the cylindrical hole 69 so as to be capable of moving upward and downward therein; and a first hydraulic chamber 71a for driving the insertion shaft member 57 downward is defined above the piston portion 80a within the cylindrical hole 69, while a second hydraulic chamber 71b for driving the insertion shaft member 57 upward is defined below the piston portion 80a.

As shown in FIG. 10, the first hydraulic chamber 71a is connected to a hydraulic pressure supply source 23 via a hydraulic pressure passage 72a within the main body member 56, a hydraulic pressure passage 72b within the base member 2, and an external hydraulic pressure passage 72c. And the second hydraulic chamber 71b is connected to the hydraulic pressure supply source 23 via a hydraulic pressure passage 72d within the base member 2 and an external hydraulic pressure passage (not shown in the figure). Incidentally, seal members 75 through 77 and other seal members 78 and 79 are provided for sealing hydraulic pressure in the first and second hydraulic chambers 71a, 71b. Moreover, the hydraulic pressure supply source 23 is electrically connected to a control unit 24.

With this second positioning device 5 it is arranged that, after the upper end portion of the insertion shaft member 57 and the upper portions of the pair of engagement members 58 have been inserted into the cylindrical hole Ha of the workpiece W with the insertion shaft member 57 in the state of being positioned at its upper limit position, then, by driving the insertion shaft member 57 downward with the hydraulic cylinder 61, not only are the pair of engagement members 58 shifted via the taper engagement mechanism 59 so that their diameter increases and so that their positioning engagement surfaces 58a are closely contacted against the cylindrical hole Ha, but also, within the range of tolerance for the internal diameter of the cylindrical hole Ha, the pair of engagement members 58 can be elastically deformed in the direction to increase their external diameter until their pair of position engagement surfaces 58a contact closely with the cylindrical hole Ha.

As shown in FIG. 10, the poor positioning detection means 64 comprises a valve hole 82 that is formed in the bottom wall portion of the internal cylindrical hole 68 and that moreover is connected to a pressurized air supply passage 81, and a valve face portion 83 that is formed on the lower surface of an annular flange 57b so as to block up the valve hole 82 when the insertion shaft member 57 reaches its lower limit position. The pressurized air supply passage 81 is connected to the pressurized air supply source 35 via an air passage 84a within the base member 2 and an external air passage 84b. A pressure switch 88 (or a pressure sensor) is connected to the external air passage 84b, and the pressurized air supply source 35 and the pressure switch 88 are electrically connected to the control unit 24.

During the non-positioning state in which the insertion shaft member 57 is in its upper limit position and during a normal positioning state in which the insertion shaft member 57 is positioned at an intermediate position between its upper limit position and its lower limit position, the pressure switch 86 detects the air pressure as "low", since the valve face 83 does not block up the valve hole 82. However, if poor positioning has occurred and the insertion shaft member 57 has reached its lower limit position, then the pressure switch 86 detects the air pressure as "high", since the valve face 83 does block up the valve hole 82.

The air blowing mechanism 65 is a device that prevents ingress of foreign matter by ejecting pressurized air from a clearance 63a defined between the insertion shaft member 57 and the pair of engagement members 58 and the scraper 63. As shown in FIG. 9, this air blowing mechanism 65 comprises a pressurized air supply passage 87 that is formed in the main body member 56, an air passage 88 internal to the base member 2, an external air passage 89 that is connected to the pressurized air supply source 35, and an air conduction passage 90 that is connected to the pressurized air supply passage 87 and that is capable of conducting pressurized air to the lower surface side of the fixing ring 62.

The air blowing mechanism 65 is constructed so as to eject pressurized air supplied from the pressurized air supply passage 87 to the air conduction passage 90 from the clearance between the outer circumferential surfaces of the insertion shaft member 57 and the three engagement members 58 and the scraper 63. The air conduction passage 90 consists of a clearance between the main body member 56 and the insertion shaft member 57, clearances between the main body member 56 and the engagement members 58, clearances between the insertion shaft member 57 and the engagement members 58, clearances between the flange portions 58c and the flange portions 58c, a clearance between the insertion shaft member 57 and the fixing ring 62, and so on.

Next, the operation of the second positioning device 5 and the advantages that it provides will be explained.

In the non-positioning state in which the piston member 80 of the hydraulic cylinder 61 and the insertion shaft member 57 are in their upper limit positions, due to the action of the taper engagement mechanism 59, the pair of engagement members 58 are put in a state in which their diameter can be reduced, and the scraper 63 centers the pair of engagement members 58 while reducing their diameter. In this state, the workpiece W with its cylindrical hole Ha is lowered down from above, and the insertion shaft member 57 and the pair of engagement members 58 are inserted into the cylindrical hole Ha while being guided by the tapered guide portion 57e of the insertion shaft member 57. At this time, if there is some error in pitch in the distance between the cylindrical holes H and Ha that respectively correspond to the first and second positioning devices 3, 5, then this error in pitch is absorbed by the movement permitting holding mechanism 60, due to the pair of engagement members 58 shifting and sliding in the X direction with respect to the insertion shaft member 57.

Next, when the piston member 80 of the hydraulic cylinder 61 is driven downward, the pair of engagement members 8 do not move downward, and accordingly their pair of tapered engagement surfaces 58b are pushed and forced to expand diametrically by the pair of tapered slide surfaces 57f of the taper engagement mechanism 59, and thereby the pair of movable slide surfaces 58e of the pair of flange portions 58c are brought a state of being in close contact with the pair of reference slide surfaces 67b of the reference reception aperture 67, and then further the pair of engagement members 58 are elastically deformed in the direction to increase their external diameter, within the range of tolerance of the cylindrical hole Ha, until their positioning engagement surfaces 58a come into close contact with the inner circumferential surface of the cylindrical hole Ha; and thereby the cylindrical hole Ha is positioned at high accuracy.

At this time, due to the taper engagement mechanism 59, the insertion shaft member 57 reaches a locked state at an intermediate position between its upper limit position and its lower limit position, and, since the valve face 83 does not block up the valve hole 82, accordingly the pressure switch 86 detects the air pressure as being "low". For this reason, it is possible to detect that positioning has been performed normally.

On the other hand, if the internal diameter of the cylindrical hole Ha is excessively large due to the manufacturing error of the internal diameter of the cylindrical hole Ha being greater than the range of its tolerance, then the insertion shaft member 57 lowers to its lower limit position, and the pressure switch 86 detects the air pressure as being "high" since the valve face 83 blocks up the valve hole 82. For this reason, it is possible to detect that poor positioning has occurred.

Even if the internal diameter of the cylindrical hole Ha is excessively large due to a workpiece of a different type from the anticipated workpiece W being put into place, it is still possible to detect poor positioning in a similar manner to that described above, since the insertion shaft member 57 drops to its lower limit position, and the pressure switch 86 detects the air pressure as being "high".

Since the cylindrical hole Ha of the workpiece W is positioned in the state in which the pair of engagement members 58 are supported by the movement permitting holding mechanism 60 so that they cannot move downwards, accordingly the workpiece W is not shifted or deformed during positioning, since no force in the downward direction acts on the workpiece W. For this reason, it is possible to prevent decrease of accuracy during machining of the workpiece, or of an object for machining that is fixed to the workpiece.

Since it is arranged for the pair of engagement members 58 to be expanded diametrically via the taper engagement mechanism 59, and it is possible to increase the amount of diametrical expansion of the pair of engagement members 58 due to the pair of engagement members 58 being elastically deformed in the direction to increase their external diameter within the range of tolerance for the internal diameter of the cylindrical hole Ha, and since it is possible to set the difference between the external diameter of the pair of engagement members 58 in their reduced diameter state and the internal diameter of the cylindrical hole Ha to be relatively large (for example to around 0.3 to 0.5 mm), accordingly not only is it possible to insert the insertion shaft member 57 and the pair of engagement members 58 rapidly into the cylindrical hole Ha in the workpiece W in a simple and easy manner, but also it is possible to set the tolerance for the infernal diameter of the cylindrical hole Ha to be greater.

Moreover, no foreign matter such as swarf or the like can get into the interior of the mechanism, since pressurized air is blown by the air blowing mechanism 65 and is ejected from the clearance 63a between the insertion shaft member 57 and the outer peripheral surfaces of the pair of engagement members 58 and the scraper 63.

Embodiment 2

Next, a second positioning device 5A according to a second specific embodiment will be explained on the basis of FIGS. 14 through 19. However, in these figures, to structural elements that are similar to corresponding ones in the second positioning device 5 described above, the same reference symbols are appended, and explanation thereof will be omitted, with only the structures that are different from the second positioning device 5 being explained.

Figure 15:
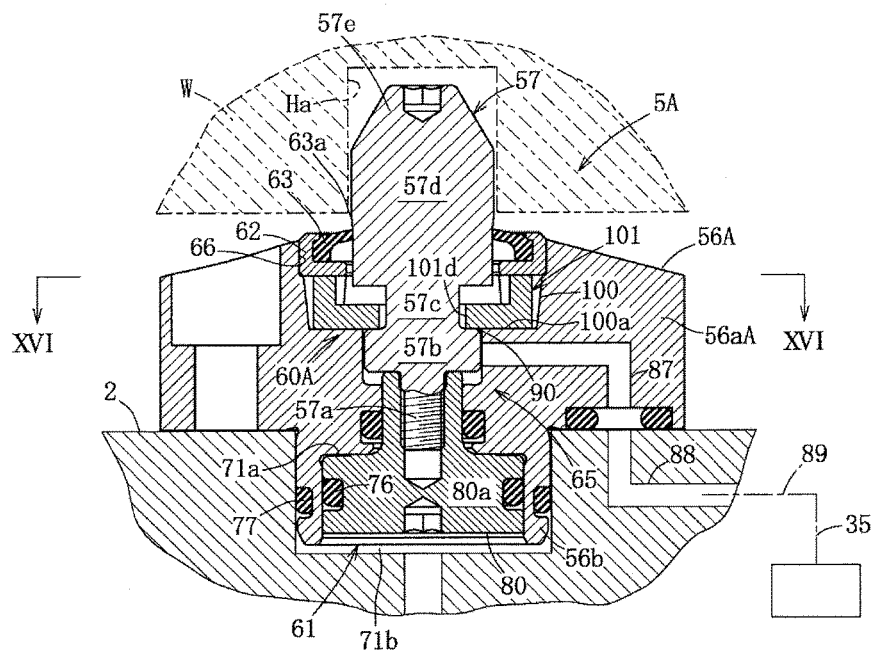
FIG. 15 is a sectional view along lines XV-XV of FIG. 14.
Figure 16:
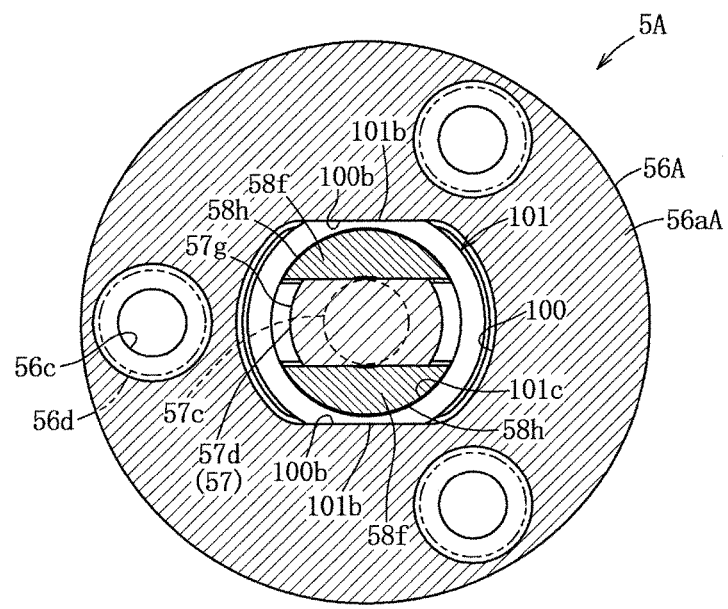
FIG. 16 is a sectional view along lines XVI-XVI of FIG. 15.
Figure 17:
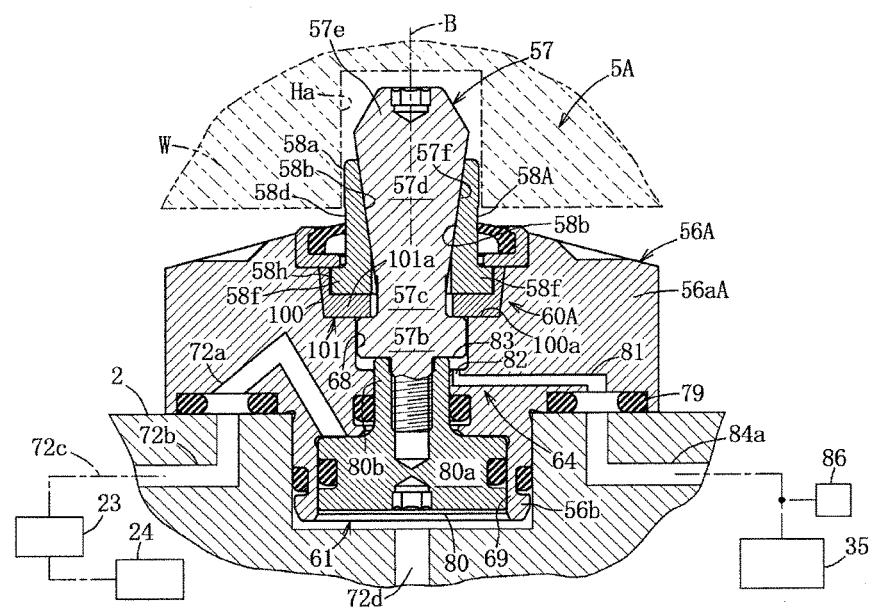
FIG. 17 is a sectional view along lines XVII-XVII of FIG. 14.
Figure 18:
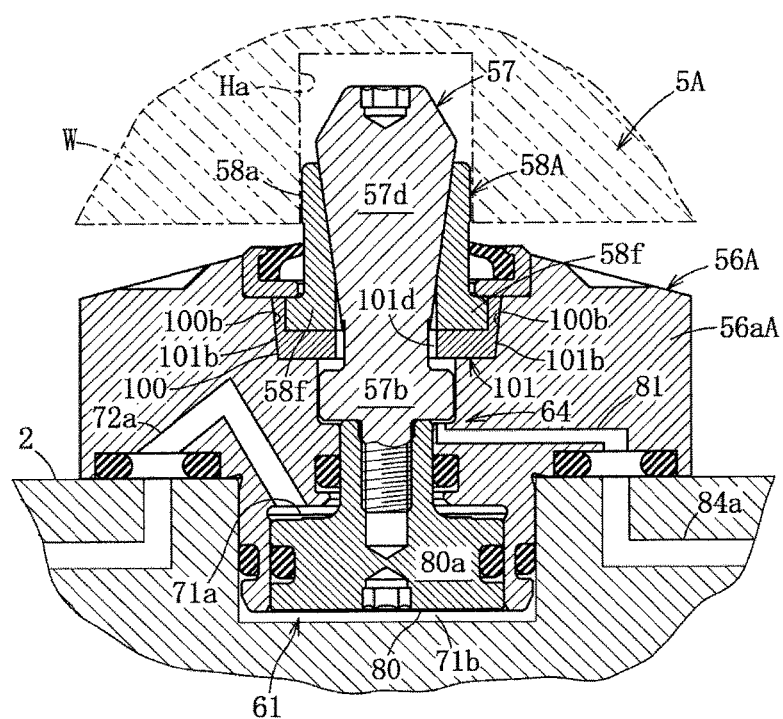
FIG. 18 is a figure corresponding to FIG. 17, during the positioning state.
Figure 19:
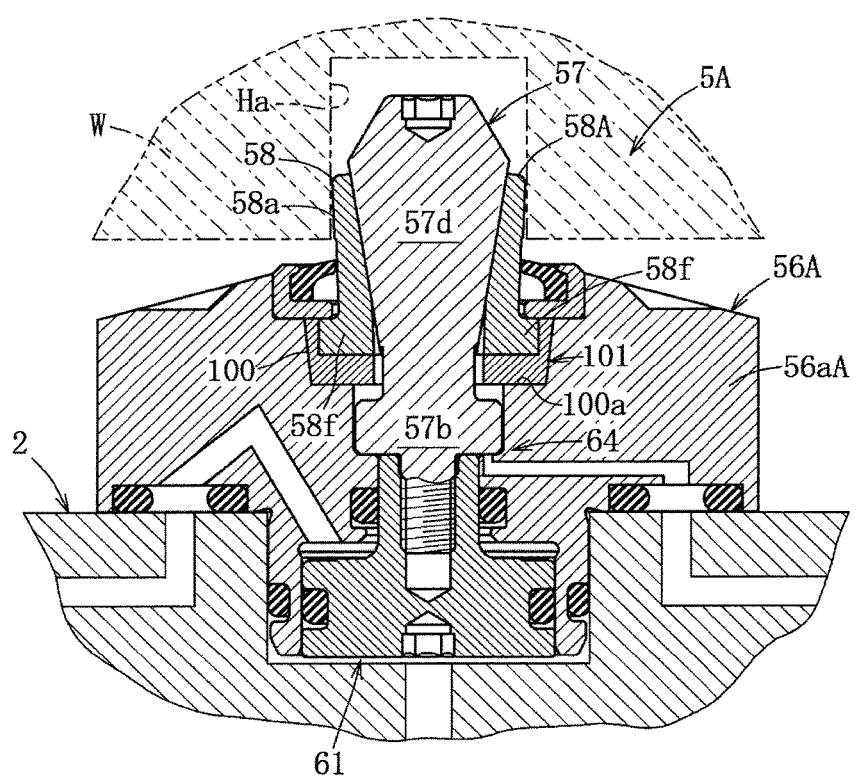
FIG. 19 is a figure corresponding to FIG. 17, when an insertion shaft member is in its lower limit position.

FIGS. 15 and 17 show a non-positioning state in which the piston member 80 of the hydraulic cylinder 61 and the insertion shaft member 57 are in their upper limit positions, whereas FIG. 19 shows a state in which the piston member 80 and the insertion shaft member 57 have moved through their full strokes and have arrived at their lower limit positions. Moreover, FIG. 18 shows a state in which positioning has been performed normally, and in this state the piston member 80 and the insertion shaft member 57 are positioned at intermediate positions between their upper limit positions and their lower limit positions.

This second positioning device 5A differs from the second positioning device 5 described above in the structures of a movement permitting holding mechanism 60A that includes a reference reception aperture 100 and of a pair of flange portions 58f of a pair of engagement members 58A. In plan view, the flange portions 58f of the pair of engagement members 58A are formed in letter D shapes, and partial cylindrical surfaces 58h are formed on the outer surfaces of the flange portions 58f in the Y direction.

The reference reception aperture 100 is a reception aperture that is formed in a flange portion 58aA for fixing of the main body member 56A so as to pass the circular cylindrical portion 57c of the insertion shaft member 57, and is shaped in plan view as an ellipse having its length direction in the X direction. The upper side of the reference reception aperture 100 connects to the lower side of the installation aperture 66. The reference reception aperture 100 has a bottom surface 100a, and a pair of side wall surfaces of the reference reception aperture 100 on opposite sides in the Y direction have a pair of reference slide surfaces 100b that are parallel to the X direction, with the pair of reference slide surfaces 100b being formed in a inclined state so that the distance between them becomes greater with going upward.

The movement permitting holding mechanism 60A includes the reference reception aperture 100, the pair of reference slide surfaces 100b, a movable reference member 101, and the bottom surface 100a of the reference reception aperture 100. The movable reference member 101 is installed in the reference reception aperture 100 so as to be shiftable in the X direction.

The movable reference member 101 has a bottom wall 101a, a pair of movable slide surfaces 101b, and a circular concave portion 101c. The bottom wall 101a has a circular hole 101d, through which the circular cylindrical portion 57c of the insertion shaft member 57 passes so as to be relatively shiftable in the X direction. And each of the pair of movable slide surfaces 101b is formed so as to be in surface contact with a respective one of the pair of reference slide surfaces 100b, and to be capable of sliding in the X direction via a sliding clearance between them.

As shown in FIGS. 15 and 17, during the non-positioning state in which the piston member 80a and the insertion shaft member 57 are in their upper limit positions, a slight clearance (for example, 0.2 to 0.4 mm) is present between the lower end surface of the bottom wall 101a of the movable reference member 101 and the bottom surface 100a of the reference reception aperture 100. And, in the positioning state shown in FIG. 18, the lower end surface of the movable reference member 101 is in close contact with the bottom surface 100a, the movable reference member 101 is supported so that if cannot move downward, and the pair of movable slide surfaces 101b are in respective close contact with the pair of reference slide surfaces 100b.

The circular concave portion 101c is open upwards. In the state in which the pair of tapered engagement surfaces 58b are engaged with the pair of tapered slide surfaces 57f of the insertion shaft member 57, the pair of flange portions 58f are engaged to the circular concave portion 101c, and the lower end surfaces of the pair of flange portions 58f are supported by the bottom surface of the circular concave portion 101c so that they cannot move downwards. And, during the positioning state, since the pair of engagement members 58A are diametrically expanded, accordingly the partial cylindrical surfaces 58h of the pair of flange portions 58f are put into a state of being closely contacted against the inner circumferential surface of the concave portion 101c.

The operation of this second positioning device 5A and the advantages that it provides will now be explained.

While fundamentally this second positioning device 5A operates in an almost similar manner to the second positioning device 5 of the first specific embodiment and provides similar advantages, supplementary explanation will be provided for parts of its operation and of its advantages that are slightly different.

During insertion of the upper end portion of the insertion shaft member 57 and the upper portions of the pair of engagement members 58A into the cylindrical hole Ha in the workpiece W, if there is some error in pitch in the distance between the cylindrical holes H, Ha which respectively correspond to the first and second positioning devices 3, 5A, then this error in pitch is absorbed by the movement permitting holding mechanism 60A due to the pair of engagement members 58A and the movable reference member 101 shifting relatively in the X direction with respect to the insertion shaft member 57.

Since the pair of reference slide surfaces 100b and the pair of movable slide surfaces 101b are formed with inclined surfaces between which the distance becomes greater with going upward, and, during the positioning state, the lower end surface of the movable reference member 101 is closely contacted against the bottom surface 100a of the reference reception aperture 100, and, furthermore, the pair of movable slide surfaces 101b are brought into close contact with the pair of reference slide surfaces 100b, accordingly play originating in the sliding clearance is eliminated, so that it is possible to position the cylindrical hole Ha in the workpiece W in the Y direction at high accuracy. During this positioning, the operation for the pair of engagement members 58A to deform elastically, within the range of tolerance for the internal diameter of the cylindrical hole Ha, is the same as in the case of the second positioning device 5 described above.

Examples in which the specific embodiments described above are partially altered will now be explained.

(1) In the first positioning device 3, it would also be acceptable to form two, or four or more, tapered slide surfaces 7f on the insertion shaft member 7, and to provide a number of engagement members 8 that corresponds to the number of those tapered slide surfaces 7f.

(2) In the first or second positioning device 3, 5, or 5A it would also be acceptable, by providing a valve hole that is formed in the wall portion of the main body member 6, 56, or 56A, that is communicated with a pressurized air supply passage, and that opens to the inner circumferential surface of the internal cylindrical hole 18 or 68, to provide a positioning release detection means that is capable of detecting that the insertion shall member 7 or 57 is in its upper limit position by the valve hole being blocked up by a valve face at the outer circumferential surface of the annular flange portion 7b or 57b when the insertion shaft member 7 or 57 is in its upper limit position.

(3) While the hydraulic cylinders 11, 61 were employed in the first and second positioning devices 3, 5, and 5A, it would be possible to employ fluid pressure cylinders such as hydraulic cylinders or air cylinders or the like.

(4) While, in the specific embodiments described above, examples were explained of cases in which the object to be positioned was a workpiece pallet, the object to be positioned is not to be considered as being limited to a workpiece pallet; in some cases, an object to be processed or a die or tool employed in manufacturing processing could be positioned.

(5) Apart from the above, provided that the gist of the present invention is not deviated from, it would be possible for a person skilled in the art to implement the present invention in various forms by implementing changes and/or additions to the specific embodiments described above.

The present invention provides a positioning device that positions, at high accuracy within a plane, a workpiece pallet to which is fixed an object that is to be subjected to machining, or an object for processing, or a workpiece of various types such as a die, a tool, or the like that is to be used for manufacturing processing.

DESCRIPTION OF NUMERALS

W: workpiece
H, Ha: cylindrical hole
1: positioning system
2: base member
3: first positioning device
5, 5A: second positioning device
6, 56, 56A: main body member
7, 57: insertion shaft member
7b, 57b: annular flange
7f, 57f: tapered slide surface
8, 58, 58A: engagement member
8b, 58b: tapered engagement surface
8c, 58c, 58f: flange portion
9, 59: taper engagement mechanism
10: movement prohibiting holding mechanism
11, 61: hydraulic cylinder
12, 62: fixing ring
13, 63: scraper
16, 66: installation aperture
17: reference reception aperture
18, 68: internal cylindrical hole
35: pressurized air supply source
36: pressure switch
37: pressurized air supply passage
58e: movable slide surface
60, 60A: movement permitting holding mechanism
64: poor positioning detection means
65: air blowing mechanism
67: reference reception aperture
67a: bottom surface
67b: reference slide surface
81: pressurized air supply passage
82: valve hole
83: valve face
90: air conduction passage
100: reference reception aperture
100a: bottom surface
100b: reference slide surface
103: movable reference member
101a: bottom wall
101b: movable slide surface
101c: circular concave portion
101d: open hole

The invention claimed is:

1. A positioning device that, by engaging an insertion shaft member provided to a base member to be a reference side into a cylindrical hole of a workpiece so as to contact closely via engagement members, is capable of positioning the workpiece in a first direction that is orthogonal to a vertical axis of the insertion shaft member while permitting shifting of the workpiece in a second direction that is orthogonal to said vertical axis and to said first direction, comprising: a main body member fixed to said base member; the insertion shaft member, that is installed to said main body member and an upper end portion of said insertion shaft member projects upward from an upper side of the main body member; a fluid pressure cylinder capable of driving said insertion shaft member upward and downward; a pair of engagement members that are disposed on opposite sides of said insertion shaft member in said first direction; a taper engagement mechanism that, by shifting said insertion shaft member downward with respect to said pair of engagement members with said fluid pressure cylinder, causes said pair of engagement members to shift so that an external diameter of said pair of engagement members increases; and a movement permitting holding mechanism that, along with supporting said pair of engagement members so that they cannot move downward, also holds them so that they cannot shift in said first direction but can shift in said second direction; and wherein, along with being constructed so that, after the upper end portion of said insertion shaft member and upper portions of the pair of engagement members have been inserted into said cylindrical hole of said workpiece via said movement permitting holding mechanism, the external diameter of said pair of engagement members is increased via said taper engagement mechanism by said insertion shaft member being driven downward by said fluid pressure cylinder so that the pair of engagement members come into close contact with said cylindrical hole, also being constructed so that, within a range of tolerance for an internal diameter of said cylindrical hole, said pair of engagement members are capable of being elastically deformed in a direction to increase the external diameter of said pair of engagement members until said pair of engagement members come into close contact with an inner circumferential surface of said cylindrical hole.

2. The positioning device according to claim 1, wherein said taper engagement mechanism comprises a pair of tapered slide surfaces that are formed parallel to said second direction on opposite side portions in said first direction of said insertion shaft member, and a pair of tapered engagement surfaces that are formed on said pair of engagement members so as to be in surface contact with the tapered slide surfaces.

3. The positioning device according to claim 2, wherein each of said engagement members has said tapered engagement surface formed on one side portion of each of said engagement members, a smooth partial cylindrical positioning engagement surface formed on an opposite side from the tapered engagement surface of each of said engagement members and capable of engaging with said cylindrical hole, and a flange portion formed at a lower end portion of each of said engagement member.

4. The positioning device according to claim 3, wherein said movement permitting holding mechanism comprises: a reference reception aperture formed in said main body member so as to pass said insertion shaft member, and having an elliptical shape in plan view with a length direction of said elliptical shape in said second direction; a bottom surface of said reference reception aperture that supports lower end surfaces of said pair of flange portions so that they cannot move downward; a pair of reference slide surfaces that are formed on a pair of vertical side wall surfaces of said reference reception aperture, parallel to said second direction; and a pair of movable slide surfaces formed on said pair of flange portions so as to be capable of sliding against said pair of reference slide surfaces in surface contact therewith.

5. The positioning device according to claim 3, wherein said movement permitting holding mechanism comprises: a reference reception aperture formed in said main body member so as to pass said insertion shaft member, and having an elliptical shape in plan view with a length direction of said elliptical shape in said second direction; a pair of reference slide surfaces that are formed on a pair of side wall surfaces of said reference reception aperture, parallel to said second direction, and moreover formed in shapes that are inclined so that the distance between them becomes greater going upward; a movable reference member that is installed in said reference reception aperture so as to be capable of shifting in said second direction, and through which said insertion shaft member passes; and a bottom surface of said reference reception aperture that supports a lower end surface of the movable reference member so that it cannot move downward; and said movable reference member comprises: a bottom wall having an elongated aperture through which said insertion shaft member passes so as to be relatively shiftable in said second direction, and a lower end surface of which is supported by said bottom surface; a pair of movable slide surfaces that are formed so as to be capable of sliding against said pair of reference slide surfaces in surface contact therewith; and a circular concave portion to which said pair of flange portions are engaged in a state in which said pair of tapered engagement surfaces are engaged with said pair of tapered slide surfaces of said insertion shaft member, and that supports lower end surfaces of said pair of flange portions so that said pair of flange portions cannot move downward.

6. The positioning device according to claim 3, wherein an internal cylindrical hole is formed in said main body member with an upper end of said internal cylindrical hole connecting to a lower end of a reference reception aperture, and having a diameter smaller than that of said reference reception aperture; and an annular flange is formed at the lower portion of said insertion shaft member and is installed in said internal cylindrical hole so as to be capable of moving upward and downward therein.

7. The positioning device according to claim 6, further comprising a valve hole formed in a bottom wall portion of said internal cylindrical hole and connected to a pressurized air supply passage, and a valve face portion that is formed on said annular flange so as to block up said valve hole when said insertion shaft member has reached a lower limit position of said insertion shaft member; and in that a poor positioning detection means is provided that detects a poor positioning state in which said insertion shaft member has reached said lower limit position via air pressure of pressurized air in said pressurized air supply passage.

8. The positioning device according to claim 3, wherein a fixing ring is provided that is fixed in an installation aperture at a top of said main body member and is fitted over an outside of said insertion shaft member and said pair of engagement members with some play therebetween, and that contacts against said pair of flange portions from above.

9. The positioning device according to claim 8, wherein a scraper made from an elastic material is provided that is fitted over the outside of said insertion shaft member and said pair of engagement members and is installed in said installation aperture and held therein by said fixing ring, and adapted so that, during a non-positioning state when said insertion shaft member is positioned at an upper limit position of said insertion shaft member, said pair of engagement members are squeezed diametrically inward and centered by said scraper.

10. The positioning device according to claim 9, wherein a pressurized air supply passage and an air conduction passage that is connected to the pressurized air supply passage and that is capable of conducting pressurized air to a lower surface side of said scraper are provided in said main body member; and ingress of foreign matter is prevented by ejecting pressurized air supplied from said pressurized air supply passage to said air conduction passage from a clearance between the insertion shaft member and the pair of engagement members and the scraper.

11. A positioning device that, by engaging an insertion shaft member that is provided to a base member to be a reference side into a cylindrical hole of a workpiece so as to contact closely via engagement members, is capable of positioning the workpiece in all directions orthogonal to a vertical axis of the insertion shaft member, comprising: a main body member fixed to said base member; the insertion shaft member, that is installed to said main body member and an upper end portion of said insertion shaft member projects upward from an upper side of the main body member; a fluid pressure cylinder capable of driving said insertion shaft member upward and downward; a plurality of engagement members that are disposed around an external circumference of said insertion shaft member; a taper engagement mechanism that, by shifting said insertion shaft member downward with respect to said plurality of engagement members with said fluid pressure cylinder, causes said plurality of engagement members to shift so that an external diameter of said plurality of engagement members increases; and a movement prohibiting holding mechanism that, along with supporting said plurality of engagement members so that they cannot move downward, also holds said plurality of engagement members so that said plurality of engagement members cannot shift in any direction; and further wherein, along with being constructed so that, after the upper end portion of said insertion shaft member and upper portions of the plurality of engagement members have been inserted into said cylindrical hole of said workpiece, the external diameter of said plurality of engagement members is increased via said taper engagement mechanism by said insertion shaft member being driven downward by said fluid pressure cylinder so that the plurality of engagement members come into close contact with said cylindrical hole, also being constructed so that, within a range of tolerance for an internal diameter of said cylindrical hole, said plurality of engagement members are capable of being elastically deformed in a direction to increase the their external diameter of said plurality of engagement members until said plurality of engagement members come into close contact with an inner circumferential surface of said cylindrical hole.

\* \* \* \* \*